United States Patent
Sako et al.

(10) Patent No.: US 7,280,661 B2
(45) Date of Patent: Oct. 9, 2007

(54) DATA OUTPUT METHOD AND APPARATUS, DATA PLAYBACK METHOD AND APPARATUS, DATA RECORDING METHOD AND APPARATUS, AND DATA RECORDING AND PLAYBACK METHOD AND APPARATUS

(75) Inventors: Yoichiro Sako, Tokyo (JP); Tatsuya Inokuchi, Kanagawa (JP); Shunsuke Furukawa, Tokyo (JP)

(73) Assignee: Sony Corporation (JP)

( * ) Notice: Subject to any disclaimer, the term of this patent is extended or adjusted under 35 U.S.C. 154(b) by 825 days.

(21) Appl. No.: 09/940,710

(22) Filed: Aug. 28, 2001

(65) Prior Publication Data

US 2002/0051960 A1 May 2, 2002

(30) Foreign Application Priority Data

Aug. 31, 2000 (JP) ............................ P2000-264031

(51) Int. Cl.
- *H04N 7/167* (2006.01)
- *H04L 9/00* (2006.01)
- *H04L 9/32* (2006.01)
- *G06K 9/00* (2006.01)
- *G06K 9/46* (2006.01)

(52) U.S. Cl. .................... 380/201; 713/176; 713/193; 382/100; 382/276

(58) Field of Classification Search ............... 713/193, 713/200; 380/201, 202, 203, 204
See application file for complete search history.

(56) References Cited

U.S. PATENT DOCUMENTS

| 6,505,160 | B1* | 1/2003 | Levy et al. ................. 704/270 |
|---|---|---|---|
| 6,549,495 | B1* | 4/2003 | Spruit et al. ............. 369/47.19 |
| 6,621,933 | B2* | 9/2003 | Chung et al. ............... 382/233 |
| 6,674,858 | B1* | 1/2004 | Kimura et al. ............. 380/202 |
| 6,707,774 | B1* | 3/2004 | Kuroda et al. ........... 369/53.21 |
| 6,993,133 | B1* | 1/2006 | Nonomura et al. ......... 380/252 |
| 7,120,251 | B1* | 10/2006 | Kawada et al. ............. 380/201 |
| 2002/0026587 | A1* | 2/2002 | Talstra et al. ............... 713/193 |
| 2004/0101282 | A1* | 5/2004 | Kuroda et al. ................ 386/94 |

FOREIGN PATENT DOCUMENTS

| EP | 0 942 418 A1 | 9/1999 |
|---|---|---|
| EP | 0942418 A1 | 9/1999 |

(Continued)

OTHER PUBLICATIONS

Linnartz J P M G: "The Ticket Concept for Copy Control Based on Embedded Signalling" Proceedings of the European Symposium on Research in Computer Security (Esorics), Springer Verlag, Berlin, DE, Sep. 16, 1998, pp. 257-274, XP000862828.

(Continued)

*Primary Examiner*—Ayaz Sheikh
*Assistant Examiner*—Kaveh Abrishamkar
(74) *Attorney, Agent, or Firm*—Lerner, David, Littenberg, Krumholz & Mentlik, LLP

(57) ABSTRACT

A method for outputting data read from a recording medium including decoding data read from a recording medium, embedding electronic watermark information in the decoded data when the decoded data is output as recording data, and outputting the resulting data.

8 Claims, 14 Drawing Sheets

FOREIGN PATENT DOCUMENTS

| | | |
|---|---|---|
| EP | 0 969 463 A1 | 1/2000 |
| EP | 0969463 A1 | 1/2000 |
| EP | 0 994 621 A2 | 4/2000 |
| EP | 0994621 A2 | 4/2000 |
| EP | 1 003 167 A2 | 5/2000 |
| EP | 1003167 A2 | 5/2000 |
| EP | 1 014 361 A2 | 6/2000 |
| EP | 1014361 A2 | 6/2000 |
| EP | 001327982 A1 * | 7/2003 |

OTHER PUBLICATIONS

Linnartz, J.P.M.G., "The Ticket Concept for Copy Control Based on Embedded Signalling", Proceedings of the European Symposium on Research in Computer Security, Sep. 16, 1998, pp. 257-274.

* cited by examiner

FIG. 2
| SCMS DATA (2 BITS) | | CONTENTS |
|---|---|---|
| 0 | 0 | COPYING FREE |
| 0 | 1 | FIRST-GENERATION-COPYING ALLOWED |
| 1 | 0 | RESERVED |
| 1 | 1 | COPYING PROHIBITED |
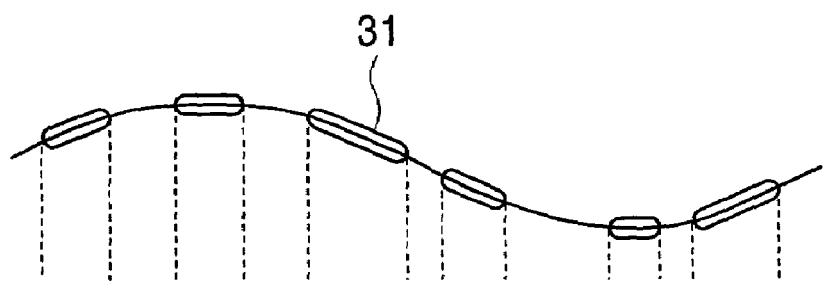
FIG. 3A
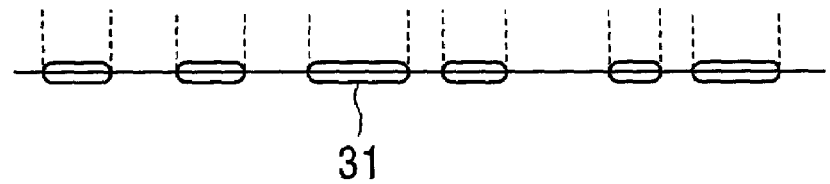
FIG. 3B

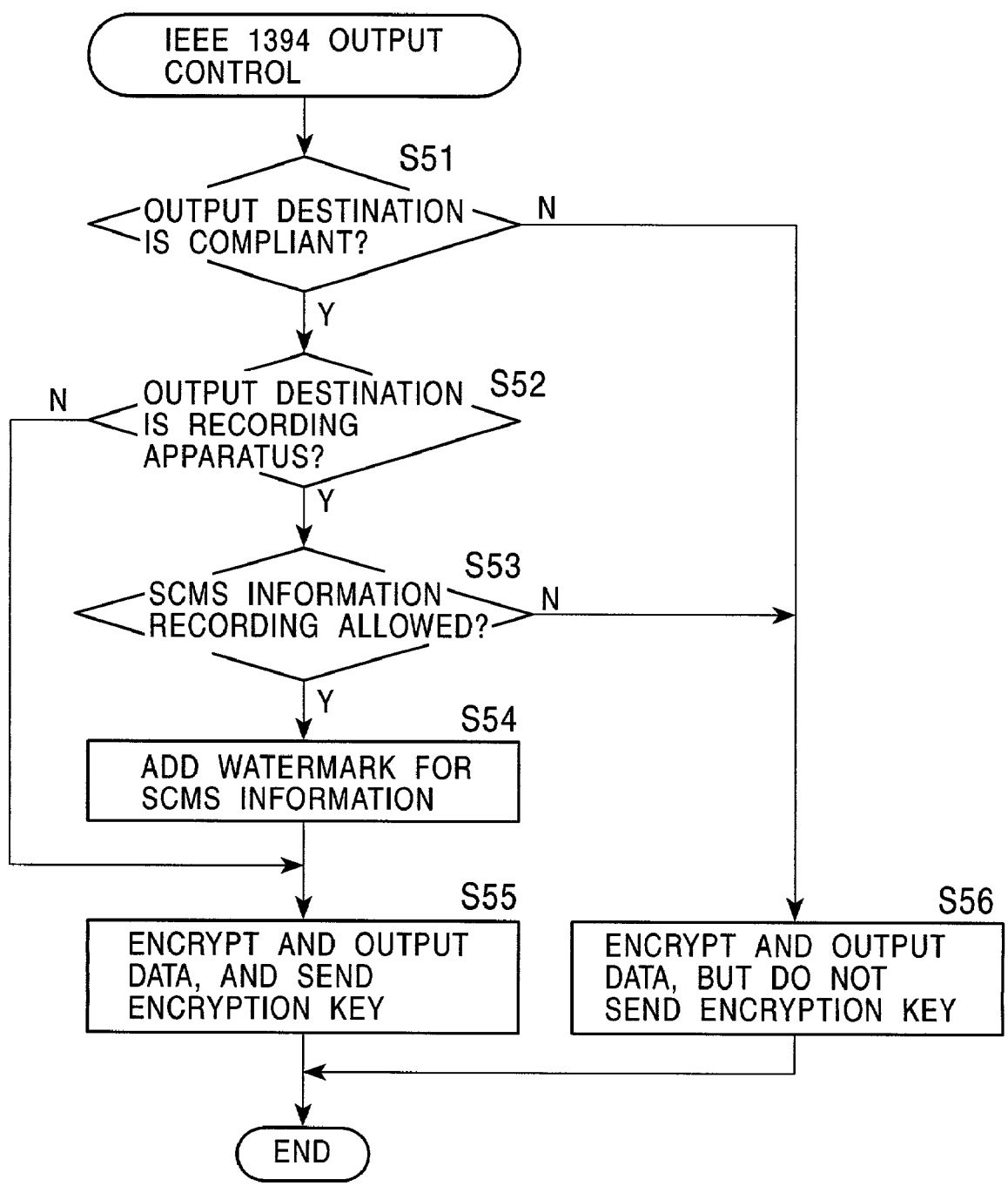

DATA OUTPUT METHOD AND APPARATUS, DATA PLAYBACK METHOD AND APPARATUS, DATA RECORDING METHOD AND APPARATUS, AND DATA RECORDING AND PLAYBACK METHOD AND APPARATUS

BACKGROUND OF THE INVENTION

1. Field of the Invention

The present invention relates to a data output method and apparatus for outputting content data to be protected for copyright violation including audio data, video data for movies etc., and game program data. The present invention further relates to a data playback method and apparatus for playing back such content data, and a data recording and playback method and apparatus for recording and playing back the content data.

2. Description of the Related Art

With the recent popularity of digital content on the Internet, compact disks, digital video disks, and the like, copyright violations involving illegal duplication (copying) of such digital content are becoming problems.

Accordingly, in order to address the copyright protection problems, actions have been taken to add copyright information such as duplication-control information to digital content such that this additional information is used to prevent the content from being duplicated (copied) without permission. A noteworthy technique of preventing illegal copying is electronic watermarking which makes it difficult to tamper with the additional information.

An electronic watermark technique is a technique in which additional information is embedded as noise in a portion of video or audio data which is imperceptible to human senses, that is, which is redundant to the resulting music or image.

Additional information which has been embedded in video or audio data using the electronic watermark technique is less removed therefrom. Meanwhile, even if the additional information is embedded in video or audio data which has been filtered or compressed, the embedded additional information may be detected from that video or audio data.

Therefore, content data is transmitted, in which copyright information such as duplication generation limiting information has been embedded as the electronic watermark additional information (hereinafter referred to as "electronic watermark information"), and is used for duplication (copying) control, thereby feasibly achieving an effective copyright protection on the content data.

Digital watermark information embedded in content data is imperceptible to the human eye or ear, but may not completely affect the quality of the reproduced and output sound or the read and output images.

That is, in a conventional copyright protection method using electronic watermark information, in which electronic watermark information is embedded in content data in advance regardless of a recording (duplicating) application before being transmitted, the quality of the resulting music or image might be essentially damaged to some extent.

SUMMARY OF THE INVENTION

It is an object of the present invention to provide a method of outputting data read from a recording medium, which solves the above-mentioned problem.

It is another object of the present invention to provide a data recording method which solves the above-mentioned problem.

It is a further object of the present invention to provide a data output method which solves the above-mentioned problem.

It is a yet further object of the present invention to provide a recording apparatus of a recording medium which solves the above-mentioned problem.

It is another object of the present invention to provide a playback apparatus of a recording medium which solves the above-mentioned problem.

According to the present invention, there is provided a method of outputting data read from a recording medium. The method includes the steps of decoding the data read from the recording medium, and embedding electronic watermark information in the decoded data if the decoded data is output as recording data.

According to the present invention, there is provided a data recording method. The method includes the steps of determining whether or not electronic watermark information was detected from received data; if the electronic watermark information was detected, executing a recording operation of the received data according to the detected electronic watermark information; and, if the electronic watermark information was not detected, canceling the recording operation of the received data.

According to the present invention, there is provided a method of outputting data read from a recording medium. The method includes the steps of detecting copy management information from the data read from the recording medium, determining the detected copy management information, and embedding electronic watermark information in the data read from the recording medium according to the determined copy management information if the data read from the recording medium is output as recording data.

According to the present invention, there is provided a data output method. The method includes the steps of determining the type of a destination device to which the data is output, determining whether or not the destination device is a device capable of transmitting and receiving the data in a secure state, determining whether or not the designation device is a recording apparatus if it is determined that the destination device is a device capable of transmitting and receiving the data in a secure state, determining copy management information attached to the output data if it is determined that the destination device is a recording apparatus, and embedding electronic watermark information in the output data according to the determined copy management information.

According to the present invention, there is provided a playback apparatus of a recording medium, which includes a head, a decoder, and an adding unit. The head reads data from the recording medium. The decoder decodes an output signal from the head. The adding unit embeds electronic watermark information in the data from the decoder if the data from the decoder is output as recording data.

According to the present invention, there is provided a data recording apparatus including a detector, an encoder, and a controller. The detector detects electronic watermark information from received data. The encoder encodes the received data. The controller allows the detected electronic watermark information from the detector to be decoded, and controls a recording operation of the data from the encoder according to the decoded electronic watermark information.

According to the present invention, there is provided a playback apparatus of a recording medium, which includes a head, a detector, and an adding unit. The head reads data from the recording medium. The detector detects copy management information from an output signal from the head. The adding unit embeds electronic watermark information according to the detected copy management information in the data read from the recording medium if the data read from the recording medium is output as recording data.

BRIEF DESCRIPTION OF THE DRAWINGS

FIG. 2 is a view for illustrating the operation in accordance with the first embodiment;

FIGS. 3A and 3B are views for illustrating information according to SCMS which is a copy generation management system;

FIG. 15 is a flowchart for illustrating the operation in accordance with the fourth embodiment.

DESCRIPTION OF THE PREFERRED EMBODIMENTS

Illustrative embodiments of the present invention will now be described with reference to the drawings. In the following description of the embodiments, content data is music data.

First Embodiment

Figure 1:
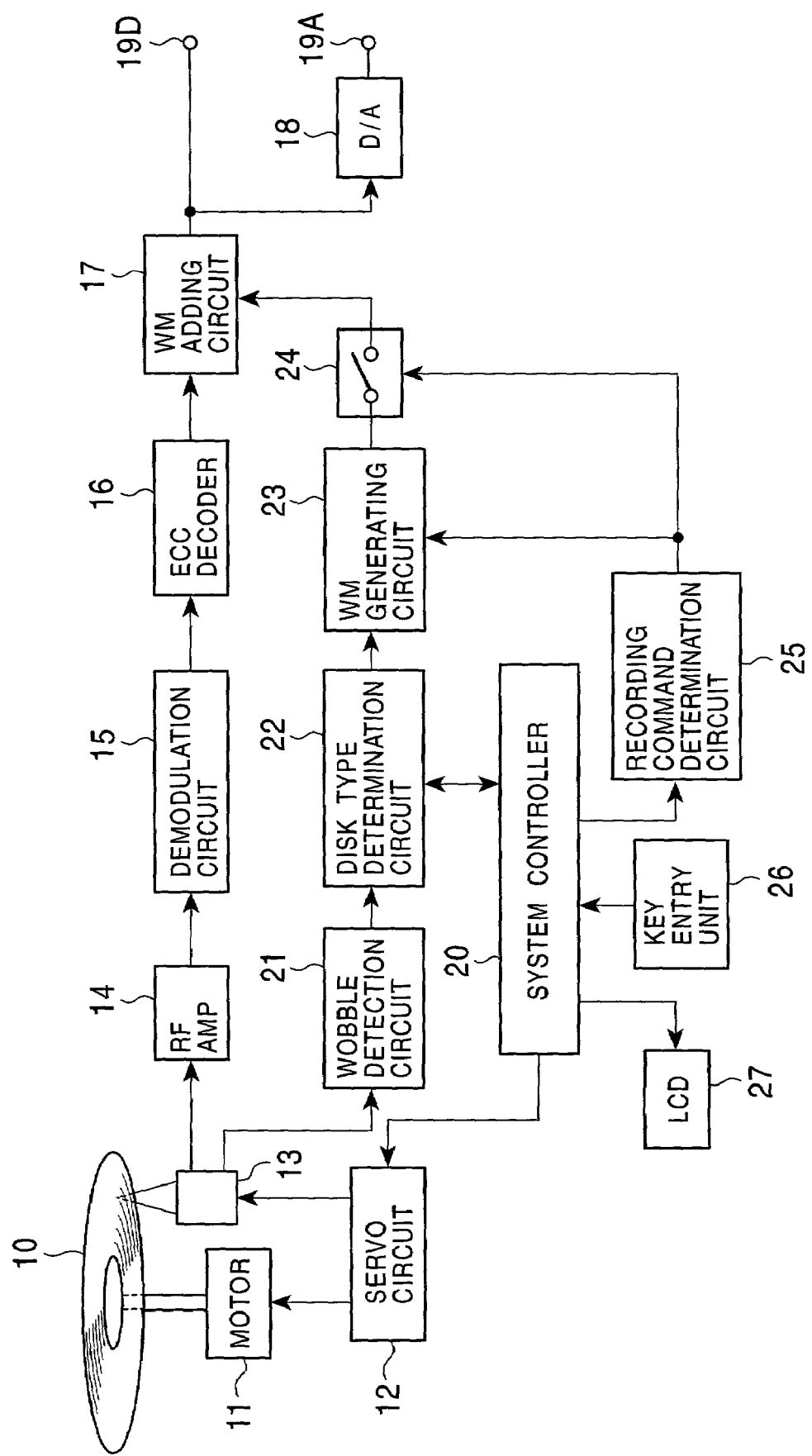
FIG. 1 is a block diagram of a data output apparatus according to a first embodiment of the present invention.

FIG. 1 is a block diagram of a data playback apparatus according to a first embodiment of the present invention.

An optical disk 10 comprises a read-only (hereinafter referred to as "ROM (read only memory) type") disk and a recordable (hereinafter referred to as "RAM (random access memory) type") disk, which can be mounted, and data can be read from either type of disk. The ROM type disk is of the type which data is recorded by an authoring system of a recording company etc., and the RAM type disk is of the type which data can be recorded by a user for personal use. The RAM type optical disk used in the first embodiment may be a CD-R (Compact Disc-Recordable) disk or a CD-RW (Compact Disc-ReWritable) disk.

The optical disk 10 is rotatively driven at the same rate as, for example, a conventional CD player by a servo circuit 12 which controls the rotational speed of a spindle motor 11. The data read from the optical disk 10 by an optical head 13 is supplied to a demodulation circuit 15 via an RF amp 14.

The demodulation circuit 15 demodulates data which is recorded and modulated according to an EFM (Eight-to Fourteen Modulation). The data demodulated by the demodulation circuit 15 is supplied to an ECC decoder 16. The ECC decoder 16 performs an error correction using CIRC (Cross Interleave Reed-Solomon Code), and supplies the audio PCM data subjected to the error correction to a watermark adding circuit (hereinafter referred to as "WM adding circuit") 17.

The electronic watermark information from a watermark generating circuit (hereinafter referred to as "WM generating circuit") 23 is supplied to the WM adding circuit 17 through a switch circuit 24. The switch circuit 24 is turned on or off in response to a control signal from a recording command determination unit 25 as is described later. By turning on or off the switch circuit 24, it is determined whether or not the electronic watermark information is embedded in the audio PCM data by the WM adding circuit 17.

The electronic watermark information used herein is a copy generation limiting information, namely, SCMS (Serial Copy Management System) information used for audio data. The SCMS information may be 2-bit information shown in FIG. 2. The electronic watermark information from the WM generating circuit 23 contains 2-bit SCMS information for selection according to a control signal supplied thereto. In the WM adding circuit 17, the electronic watermark information is embedded in the audio data in a form imperceptible to the human ear even if it overlaps the audio data.

The output data of the WM adding circuit 17 is output as digital output data to a digital output terminal 19D, and is also supplied to a D/A (digital-to-analog) converter 18 for conversion into an analog signal, which is then output from an analog output terminal 19A as an analog output signal.

The data playback apparatus according to the present invention is designed so as to allow a user to select a playback application when playing the optical disk 10, that is, to select either playback for a sound reproduction such that the data is output as audible sound from a speaker etc., or playback for duplication and recording of the data recorded on the optical disk 10 such that a playback signal is output to a recording apparatus. Therefore, according to the present invention, a key entry unit 26 includes both a playback command key to give a playback command for the sound reproduction, and a recording command key to give a recording command in order to output a playback signal to the recording apparatus. It is not necessary that the playback command key and the recording command key be separately provided from each other in the apparatus, and the keys may be incorporated into, for example, a single seesaw switch.

When the recording command key is operated in the key entry unit 26, the switch circuit is turned on, so that the electronic watermark information is embedded in the audio data by the WM adding circuit 17. That is, a system controller 20 detects which key has been operated in the key entry unit 26, and, once it detects an operation of the recording command key, informs the recording command determination unit 25 of this. Then, the recording command determination unit 25 recognizes recording command mode in which a playback signal is output to the recording apparatus, and turns on the switch circuit 24. This allows the electronic watermark information from the WM generating circuit 23 to be supplied to the WM adding circuit 17 to execute embedding of the electronic watermark information.

In the first embodiment, the electronic watermark information generated from the WM generating circuit 23 is changed depending upon whether the optical disk 10 loaded on the apparatus is of the ROM type or the RAM type.

When it is a ROM type disk, audio data recorded thereon may be typically the original data. In the SCSM, therefore, the playback signal of this ROM type disk may indicate "first-generation-copying allowed," and the SCMS information to be embedded as electronic watermark information may be 2-bit information of [01].

On the other hand, when it is a RAM type disk, the data recorded thereon could have already been copied once, and the SCMS information to be embedded as electronic watermark information may be 2-bit information of [11].

In the first embodiment, according to the type of the optical disk 10 loaded, the WM generating circuit 23 determines electronic watermark information to be generated. Hence, the type of the optical disk 10 loaded must be determined in the present invention. A method of determining the type of the optical disk 10 loaded in accordance with the present invention is described below.

According to the first embodiment, portions in which pits 31 are wobbled are formed on a ROM type disk, as shown in FIG. 3A. This pit wobbling information cannot be recorded on a normal recording apparatus, and is thus formed in a sequence of pits shown in FIG. 3B when copied on a RAM type disk.

According to the present invention, therefore, it can be seen whether the optical disk 10 is a ROM type disk or a RAM type disk by detecting the pit wobbling.

The information from the optical head 13 is supplied to a wobble detection circuit 21 to determine whether or not the pit wobbling shown in FIG. 3A is detected, and an output of the detection is supplied to a medium determination circuit 22.

The medium determination circuit 22 determines whether the optical disk 10 is of the ROM type or of the RAM type according to whether or not the pit wobbling shown in FIG. 3A is found, and supplies an output of the result of the determination to the system controller 20 as well as to the WM generating circuit 23.

As described above, when the optical disk 10 is a ROM type disk, the WM generating circuit 23 generates 2-bit information indicating "first-generation-copying allowed" as electronic watermark information. When the optical disk 10 is a RAM type disk, it generates 2-bit information indicating "copy prohibited" as electronic watermark information.

When the recording command key is operated in the key entry unit 26, the WM generating circuit 23 is enabled (operable) to generate the electronic watermark information, and the switch circuit 24 is turned on, so that the electronic watermark information is embedded by the WM adding circuit 17 in the audio data which is then output.

The system controller 20 allows information necessary to the user to be displayed on a display unit 27 including an LCD (liquid crystal display).

Figure 4:
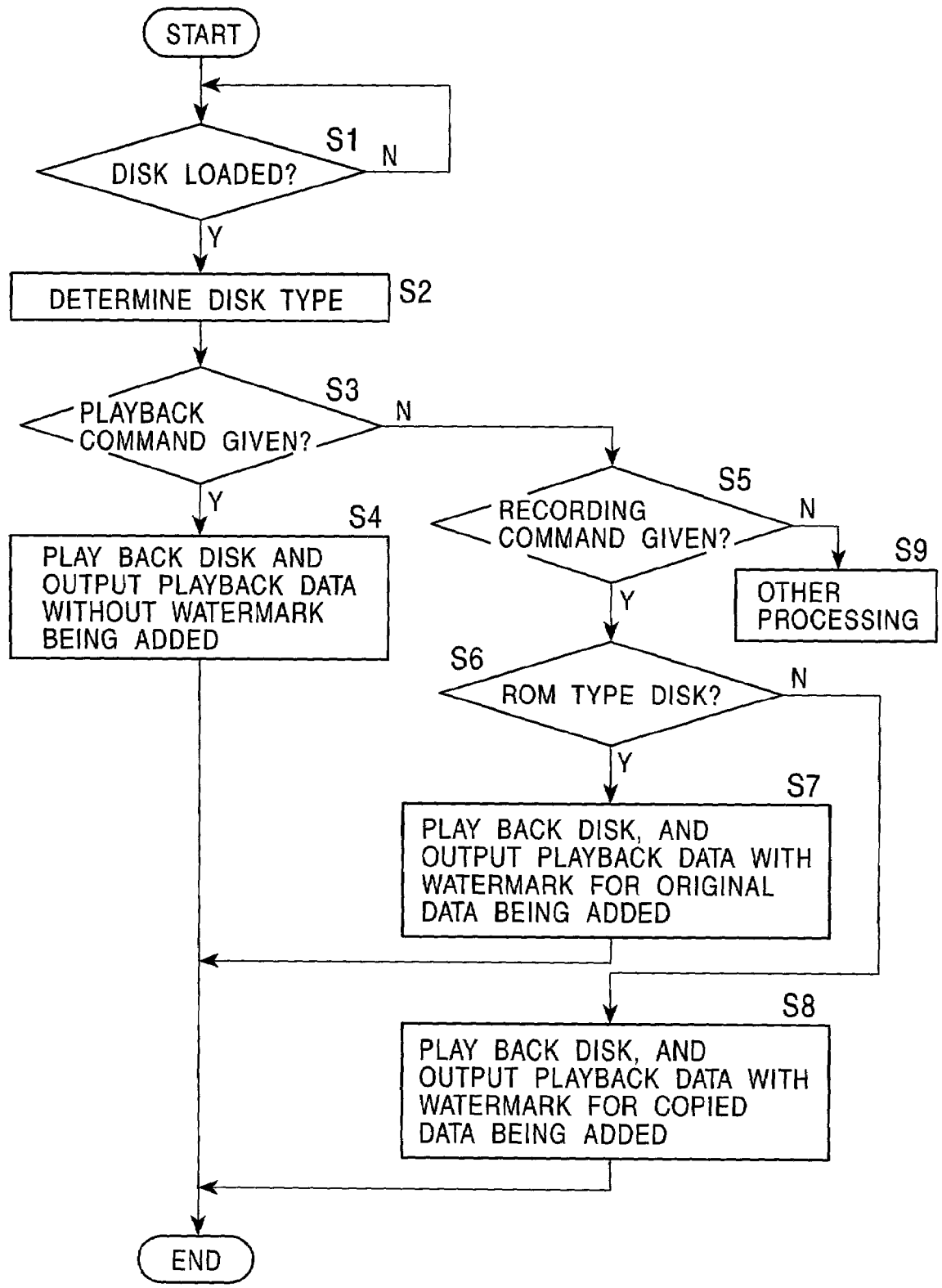
FIG. 4 is a flowchart for illustrating the operation in accordance with the first embodiment.

The data playback operation (a data playback method according to the first embodiment) of the data playback apparatus according to the first embodiment which has been described with respect to FIG. 1 is described with reference to a flowchart shown in FIG. 4.

First, it is determined whether or not the optical disk 10 is loaded on the data playback apparatus (step S1). Then, it is determined whether the optical disk 10 loaded is of the ROM type or of the RAM type (step S2). The determination at step S2 on the type of the optical disk 10 loaded is performed by detecting the pit wobbling described above.

Next, it is determined whether or not the playback command key has been operated in the key entry unit 26 (step S3). If it is determined that the playback command key has been operated, the optical disk 10 is played back, and a digital signal or an analog signal without the electronic watermark information embedded therein is output as playback data from the digital output terminal 19D and/or the analog output terminal 19A (step S4).

In response to the output of the recording command determining unit 25, the WM generating circuit 23 is disabled (inoperable) and the switch circuit 24 is turned off. Thus, the electronic watermark information is not supplied to the WM adding circuit 17, and the data from the ECC encoder 16 is output from the digital output terminal 19D and/or is first converted into an analog signal which is then output from the analog output terminal 19A.

If it is determined at step S3 that the playback command key has not been operated, it is determined whether or not the recording command key has been operated (step S5). If it is determined that the recording command key has been operated, it is determined whether the disk type determined at step S2 is the ROM type or not (step S6). If it is determined that it is the ROM type, the optical disk 10 is played back, and the audio data is output with the electronic watermark information indicating "first-generation-copying allowed" being embedded therein (step S7).

Since the recording command key has been operated, in response to the output of the recording command determining unit 25, the WM generating circuit 23 is enabled and the switch circuit 24 is turned on. An output of the determination indicating that the optical disk 10 is of the ROM type is also supplied to the WM generating circuit 23 from the disk type determining circuit 22. Therefore, the electronic watermark information indicating "first-generation-copying allowed" is embedded in the data from the ECC encoder 16 by the WM adding circuit 17. The audio data with the electronic watermark information embedded therein is output from the digital output terminal 19D or the analog output terminal 19A.

If it is determined at step S6 that the optical disk 10 is of the RAM type, the optical disk 10 is played, and the electronic watermark information indicating "copy prohibited" in this example is embedded in the audio data, which is then output.

Since the recording command key has been operated, in response to the output of the recording command determining unit 25, the WM generating circuit 23 is enabled and the switch circuit 24 is turned on. An output of the determination indicating that the optical disk 10 is of the RAM type is also supplied to the WM generating circuit 23 from the disk type determining circuit 22. Therefore, the electronic watermark information indicating "copy prohibited" is embedded in the data from the ECC encoder 16 by the WM adding circuit 17. The audio data with the electronic watermark information indicating "copy prohibited" being embedded therein is output from the digital output terminal 19D or is first converted into an analog signal which is then output from the analog output terminal 19A.

It is noted that, if a key other than the playback command key and the recording command key has been operated in the key entry unit 26, a process corresponding to that key is performed (step S9).

Accordingly, in the data playback apparatus of the first embodiment, electronic watermark information is embedded in audio data only when the data read from the optical disk 10 is output as recording data, while the electronic watermark information is not being embedded in data for normal playback. This prevents a degradation in the quality of the data due to the electronic watermark information being embedded therein.

Figure 5:
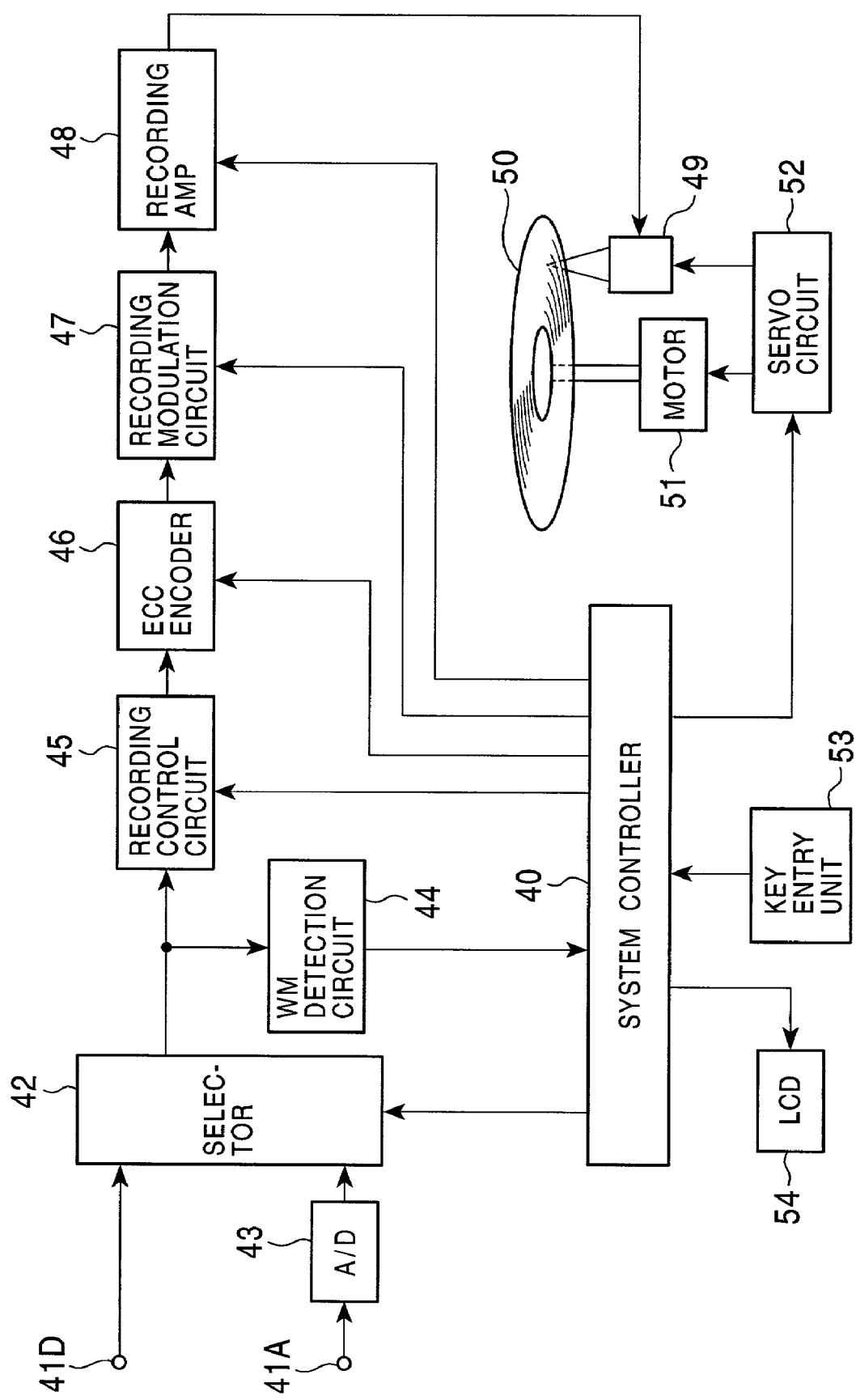
FIG. 5 is a block diagram of a data recording apparatus according to the first embodiment of the present invention.

Next, a data recording apparatus in the first embodiment which records data in response to the data output according to the above-described procedure is described. FIG. 5 is a block diagram of the data recording apparatus according to the first embodiment.

In FIG. 5, digital audio PCM data which is input through a digital input terminal 41D is supplied to a selector 42. An analog audio signal which is input through an analog input terminal 41A is supplied to an A/D converter 43 for conversion into audio PCM data, which is then supplied to the selector 42.

A system controller 40 supplies to the input selector 42 an input select signal indicating which of the audio PCM data is to be output from the input selector 42. The system controller 40 further generates an input select signal according to the selection input operated by a user through a key entry unit 53.

The data obtained from the selector 42 is supplied to a recording control circuit 45 as well as to a watermark detection circuit 44. An output of the detection of the watermark detection circuit 44 is supplied to the system controller 40. The system controller 40 supplies the control signal according to the output of the detection of the watermark detection circuit 44 to the recording control circuit 45 to perform a recording control which determines whether to execute the recording operation or to disapprove the recording.

If it is determined in the recording control circuit 45 that the recording is executed, the audio PCM data is supplied from the recording control circuit 45 to the ECC encoder 46.

The ECC encoder 46 performs the error correction encoding on the input data using CIRC (Cross Interleave Reed-Solomon Code). The ECC encoder 46 supplies the data subjected to the error correction encoding to a recording modulation circuit 47. The recording modulation circuit 47 performs a recording modulation process on the data according to an EFM (Eight-to-Fourteen Modulation).

The recording modulation circuit 47 supplies the modulated data to a recording head 49 through a recording amp 48. The recording head 49 is used to write data into an optical disk 50 of the RAM type. The optical disk 50 is rotatively driven by a spindle motor 51 so as to provide a predetermined rotational speed through a servo control having a constant linear speed by a servo circuit 52. The servo circuit 52 generates a speed servo signal based on, for example, the audio PCM signal to be recorded, and supplies it to the spindle motor 51.

In the data recording apparatus according to the first embodiment, if the optical disk 50 is a CD-R disk, the recording head 49 heats an organic dye layer used as the recording layer of the optical disk 50 to deform a substrate of the optical disk 50 to cause a physical change having the same function as that of the pits in the optical disk of the ROM type, so that the data may be recorded. If it is a CD-RW disk, the state is reversibly changed between a crystal state and an amorphous state, so that the data may be recorded.

The system controller 40 allows information necessary to the user to be displayed on a display unit 54.

Figure 6:
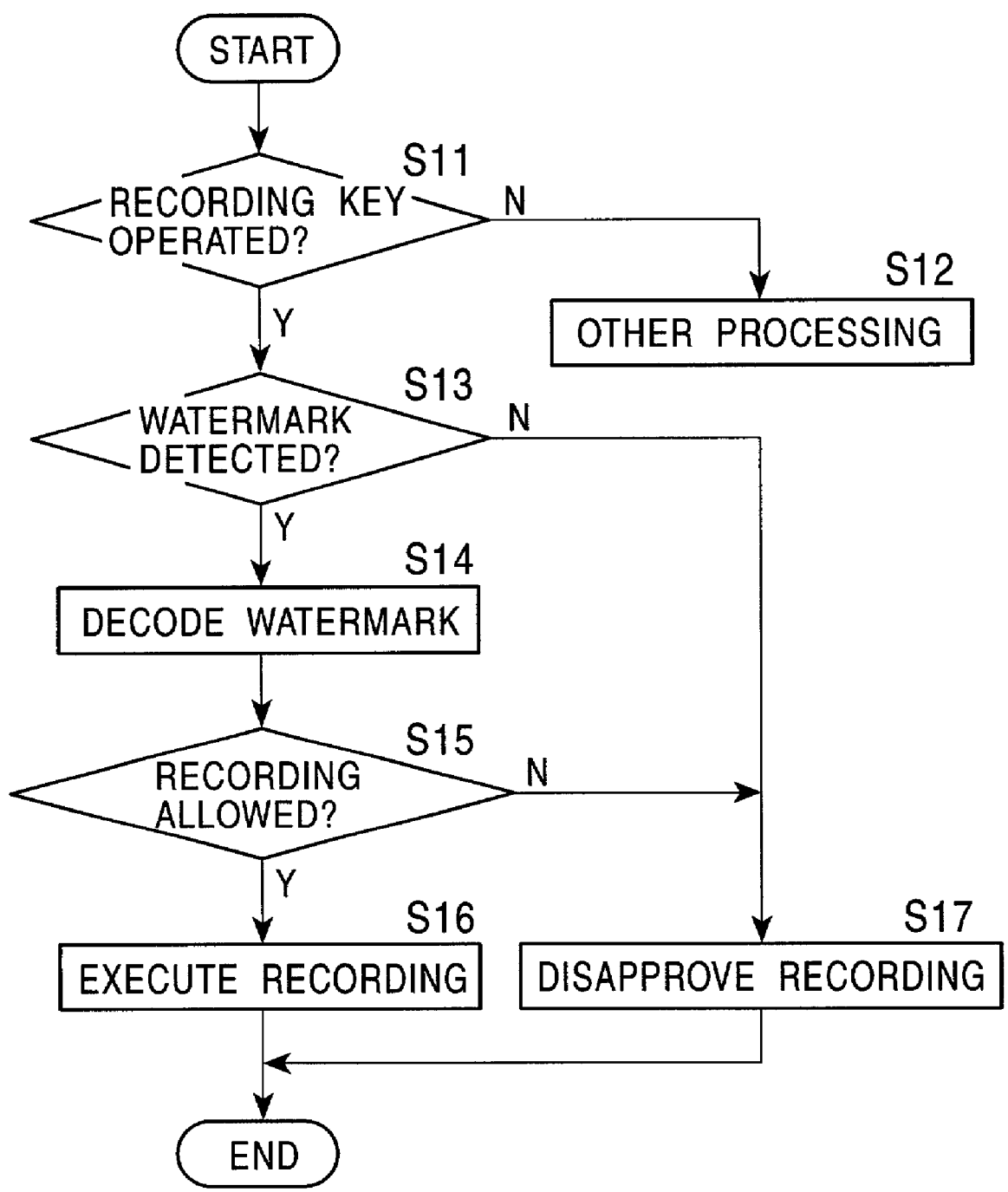
FIG. 6 is a flowchart for illustrating the operation of the data recording apparatus in accordance with the first embodiment shown in FIG. 5.

The data recording operation (a data recording method according to the first embodiment) of the data recording apparatus according to the first embodiment which has been described with respect to FIG. 5 is described with reference to a flowchart shown in FIG. 6.

First, it is determined whether or not the recording command key in the key entry unit 53 has been operated to give a recording command (step S11). If it is determined that the recording command key has not been operated, a process corresponding to some other key that has been operated is performed (step S12).

If the recording command key has been operated, it is determined that the recording command has been given, and a detection of the electronic watermark information is performed such that it is determined whether or not the electronic watermark information was detected (step S13).

As described above, according to the present invention, the electronic watermark information must have been embedded in the audio data if the playback for recording was selected. Therefore, if the electronic watermark information was not detected, it can be seen that the playback data has been entered without permission.

Accordingly, if the electronic watermark information was not detected at step S13, the system controller 40 controls the recording control circuit 45 so that the recording is disapproved (step S17). More specifically, supplying of the recording data to the ECC encoder 46 is stopped, so that the recording operation is cancelled.

If the electronic watermark information was detected at step S13, the electronic watermark information is decoded (step S14). It is determined whether or not the decoded electronic watermark information indicates "first-generation-copying allowed" (step S15). If it indicates "first-generation-copying allowed," the recording control circuit 45 is controlled so as to execute the recording operation (step S16). Then, the data is supplied to the ECC encoder 46 and the subsequent components so that the data is duplicated and recorded on the optical disk 50.

If it is determined at step S15 that the electronic watermark information indicates "recording prohibited," the process proceeds to step S17, in which the recording operation is cancelled. Then, the recording process terminates.

Accordingly, the data recording apparatus according to the present invention is arranged so that the duplication and recording operation may be performed only when the electronic watermark information is being embedded in the data. Therefore, if the electronic watermark information is altered to be removed from the recorded data, the duplication and recording of the data are disapproved, thereby preventing an illegal duplication.

As described above, data in which the electronic watermark information is not embedded cannot be duplicated and recorded. In the data playback apparatus, therefore, the data is output with the electronic watermark information embedded therein if the optical disk 10 is of the ROM type, while the data is output without the electronic watermark information embedded therein if the optical disk 10 is of the RAM type, thereby providing the same advantages as described above.

In that case, in the data playback apparatus, it is not necessary that the electronic watermark information complying with the SCMS be embedded, and some data should only be embedded as electronic watermark information. In the data recording apparatus, it should only be determined whether or not the electronic watermark information was detected, and the electronic watermark information decoding step S14 of FIG. 6 is not necessary, making the process more simple.

In the data playback apparatus according to the first embodiment, the switch circuit 24 is turned on or off to control embedding of the electronic watermark information, but the switch circuit 24 is not necessarily provided and the WM generating circuit 23 may be turned on or off, thereby providing the same advantages.

Second Embodiment

According a second embodiment of the present invention, different electronic watermark information is used depending upon output signal formats, and the electronic watermark information is embedded in different manners depending upon whether content data to be output is original data (when a ROM type disk is played) or copied data (when a RAM type disk is played).

Figure 7:
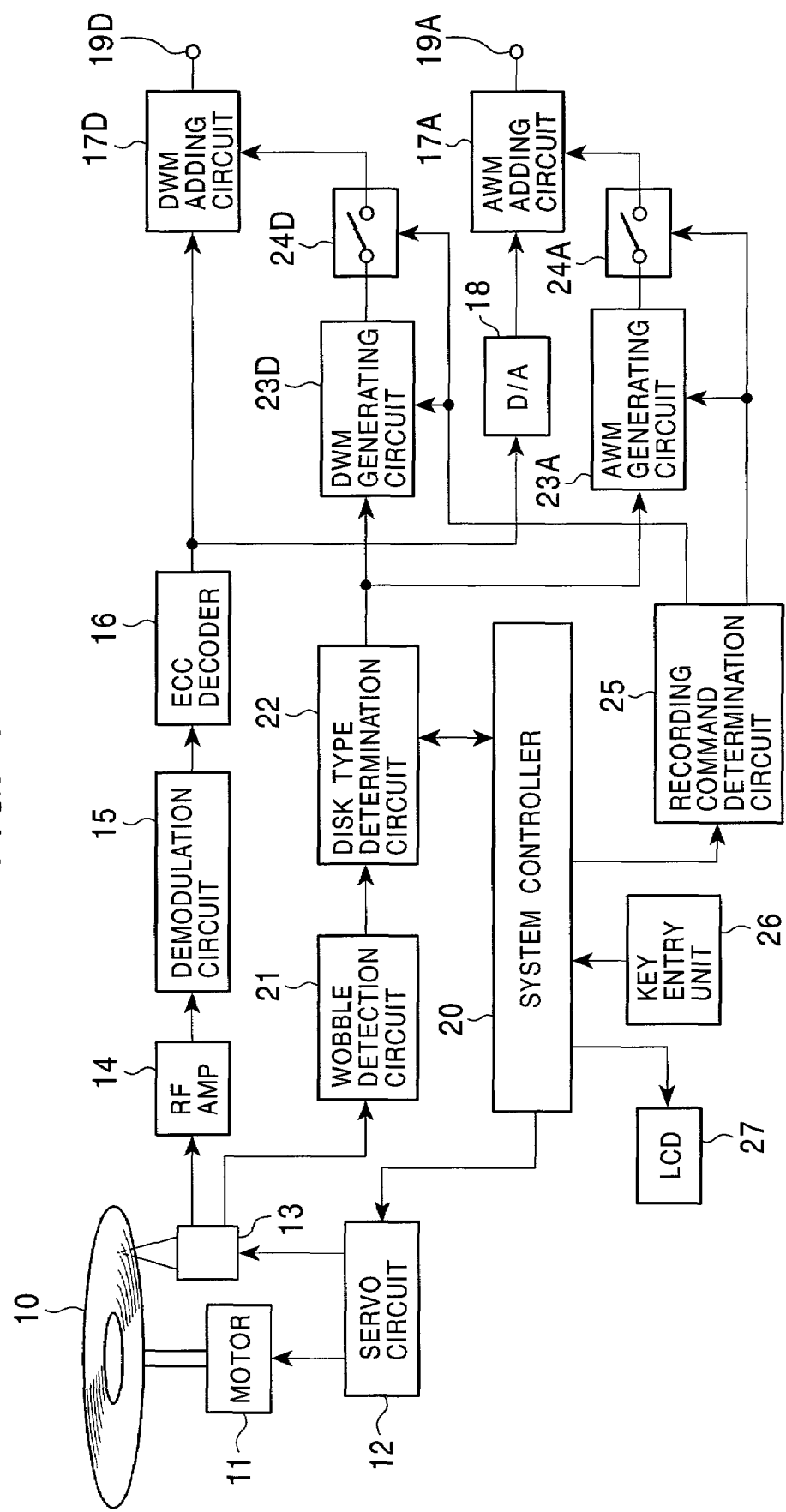
FIG. 7 is a block diagram of the data output apparatus according to a second embodiment of the present invention.

FIG. 7 is a block diagram of a data playback apparatus according to the second embodiment. The illustration of FIG. 7 is different from the illustration of FIG. 1 in that two types of watermark adding circuit units are separately provided for a digital output data format and for an analog output data format. In FIG. 7, the same reference numerals are assigned to the same components as those in FIG. 1.

According to the second embodiment, the data from the ECC decoder 16 is supplied to the digital output terminal 19D through a digital watermark adding circuit (hereinafter referred to as "DWM adding circuit") 17D, as well as to the D/A converter 18 for conversion into an analog signal. The resulting analog signal is supplied to the analog output terminal 19A through an analog watermark adding circuit (hereinafter referred to as "AWM adding circuit") 17A.

Electronic watermark information for digital data (hereinafter referred to as "digital watermark information") from a digital watermark generating circuit (hereinafter referred to as "DWM generating circuit") 23D is supplied to the DWM adding circuit 17D through a switch circuit 24D. Electronic watermark information for analog data (hereinafter referred to as "analog watermark information") from an analog watermark generating circuit (hereinafter referred to as "AWM generating circuit") 23A is supplied to the AWM adding circuit 17A through a switch circuit 24A.

An output of the determination of the disk type determining circuit 22 is supplied to the DWM generating circuit 23D and the AWM generating circuit 23A.

According to the second embodiment, the recording command determining unit 25 determines which of the digital output and the analog output is selected for the recording command. The key entry unit 26 further includes output selection keys for the digital output and the analog output. The system controller 20 identifies the recording command key and the output selection keys, and transfers the information on the keys to the recording command determining unit 25.

The recording command determining unit 25 outputs either a signal for controlling the DWM generating circuit 23D and the switch circuit 24D, or a signal for controlling the AWM generating circuit 23A and the switch circuit 24A according to a result of the identification. If both outputs are selected, of course, a signal for controlling both is output.

As described above, the DWM generating circuit 23D and the AWM generating circuit 23A each generate and output different electronic watermark information depending upon whether content data to be output is original data or copied data. In this connection, electronic watermark information which minimizes a degradation of the quality of sound as much as possible is embedded in the original data. On the other hand, electronic watermark information which provides higher accuracy of detection of the electronic watermark information even at the sacrifice of the quality of sound is embedded in the copied data.

For example, the DWM generating circuit 23D generates electronic watermark information which is embedded in the least significant bit (LSB) of 16-bit PCM data for the original data, while generating electronic watermark information which is embedded in up to 4SB (fourth bit from the LSB) of the 16-bit PCM data for the copied data.

Figure 8A:
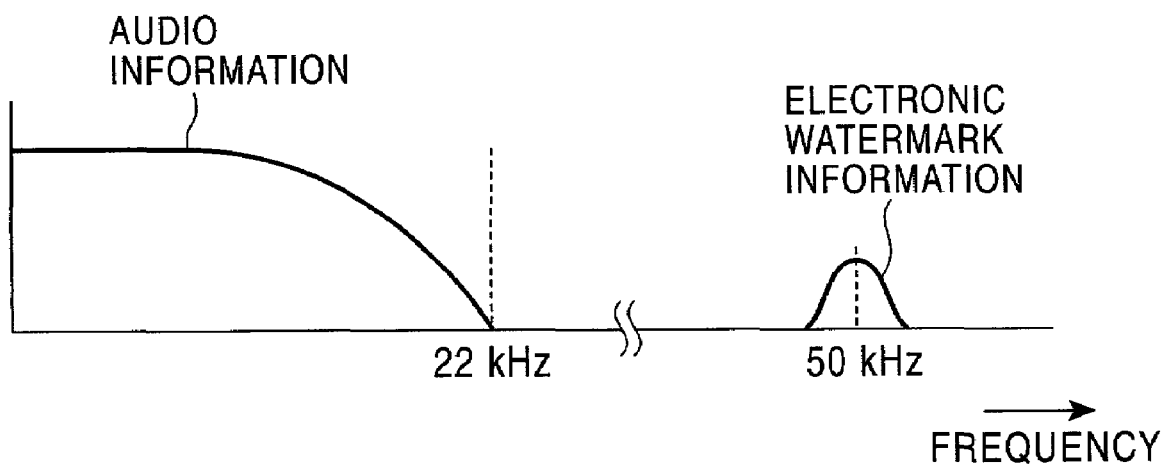
FIGS. 8A and 8B are views for illustrating the second embodiment.
Figure 8B:
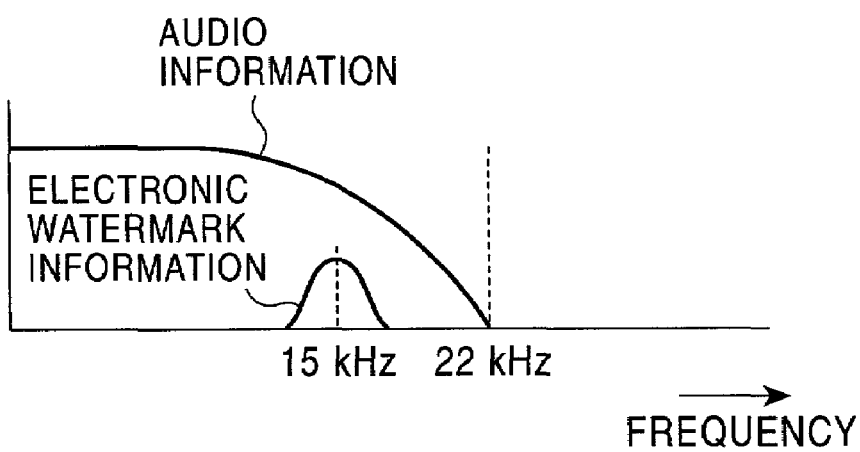

The AWM generating circuit 23A generates electronic watermark information which is embedded in a portion in the vicinity of 50 kHz that is imperceptible to the human ear, as shown in FIG. 8A, for the original data, and generates electronic watermark information which is embedded in a portion in the vicinity of 15 kHz, as shown in FIG. 8B, for the copied data.

The structure of the other components is the same as in the data playback apparatus shown in FIG. 1.

The data playback operation (a data playback method according to the second embodiment) of the data playback apparatus according to the second embodiment which has been described with respect to FIG. 7 is described with reference to a flowchart shown in FIG. 9.

First, it is determined whether or not the optical disk 10 is loaded on the data playback apparatus (step S21). Then, in the same way as in step S2 of FIG. 4, it is determined whether the optical disk 10 loaded is of the ROM type or of the RAM type (step S22).

Next, it is determined whether or not the playback command key has been operated in the key entry unit 26 (step S23). If it is determined that the playback command key has been operated, the optical disk 10 is played back, and playback data is output from the digital output terminal 19D and/or the analog output terminal 19A while the electronic watermark information is not being embedded in the output signal output as the playback command from the apparatus (step S24).

In response to the output of the recording command determining unit 25, the DWM generating circuit 23D and the AWM generating circuit 23A are disabled (inoperable) and the switch circuit 24D and the switch circuit 24A are turned off. Thus, the electronic watermark information is not supplied to the DWM adding circuit 27D and the AWM adding circuit 27A, and the data from the ECC encoder 16 is output from the digital output terminal 19D and/or the analog output terminal 19A.

If it is determined at step S23 that the playback command key has not been operated, it is then determined whether or not the recording command key in analog output format has been operated (step S25). If it is determined that the recording command key in analog output format has been operated, the optical disk 10 is played, and the audio data is output from the data playback apparatus with the analog watermark information according to the disk type determined at step S22 being embedded therein (step S26).

In response to the output of the recording command determining unit 25, the AWM generating circuit 23A is enabled and the switch circuit 24A is turned on. Based on the output of the disk type determination of the disk type determining circuit 22, the AWM generating circuit 23A determines whether data to be played back and output is original data or copied data. If it is determined to be the original data, the electronic watermark information indicating "first-generation-copying allowed" is supplied to the AWM adding circuit 17A so that it is embedded in a manner shown in FIG. 8A. If it is determined to be the copied data, the electronic watermark information indicating "copy prohibited" is supplied to the AWM adding circuit 17A so that it is embedded in a manner shown in FIG. 8B. The analog audio data is output from the analog output terminal 19A with the electronic watermark information thus embedded therein.

If it is determined at step S25 that the recording command key in analog output format has not been operated, it is then determined whether or not the recording command key in digital output format has been operated (step S27). If it is determined that the recording command key in digital output format has been operated, the optical disk 10 is played back, and the audio data is output from the data playback apparatus with the digital watermark information according to the disk type determined at step S22 being embedded therein (step S28).

In response to the output of the recording command determining unit 25, the DWM generating circuit 23D is enabled and the switch circuit 24D is turned on. Based on the output of the disk type determination of the disk type determining circuit 22, the DWM generating circuit 23D determines whether data to be played back and output is original data or copied data. If it is determined to be the original data, the electronic watermark information indicating "first-generation-copying allowed" is supplied to the DWM adding circuit 17D so that it is embedded only in the LSB of the data to be played back and output. If it is determined to be the copied data, the electronic watermark information indicating "copy prohibited" is supplied to the DWM adding circuit 17D so that it is embedded up to 4SB from the LSB of the data to be played back and output. The digital audio data is output from the digital output terminal 19D with the electronic watermark information thus embedded therein.

If a key other than the playback command key and the recording command key has been operated in the key entry unit 26, a process according to that key is performed (step S29).

Figure 10:
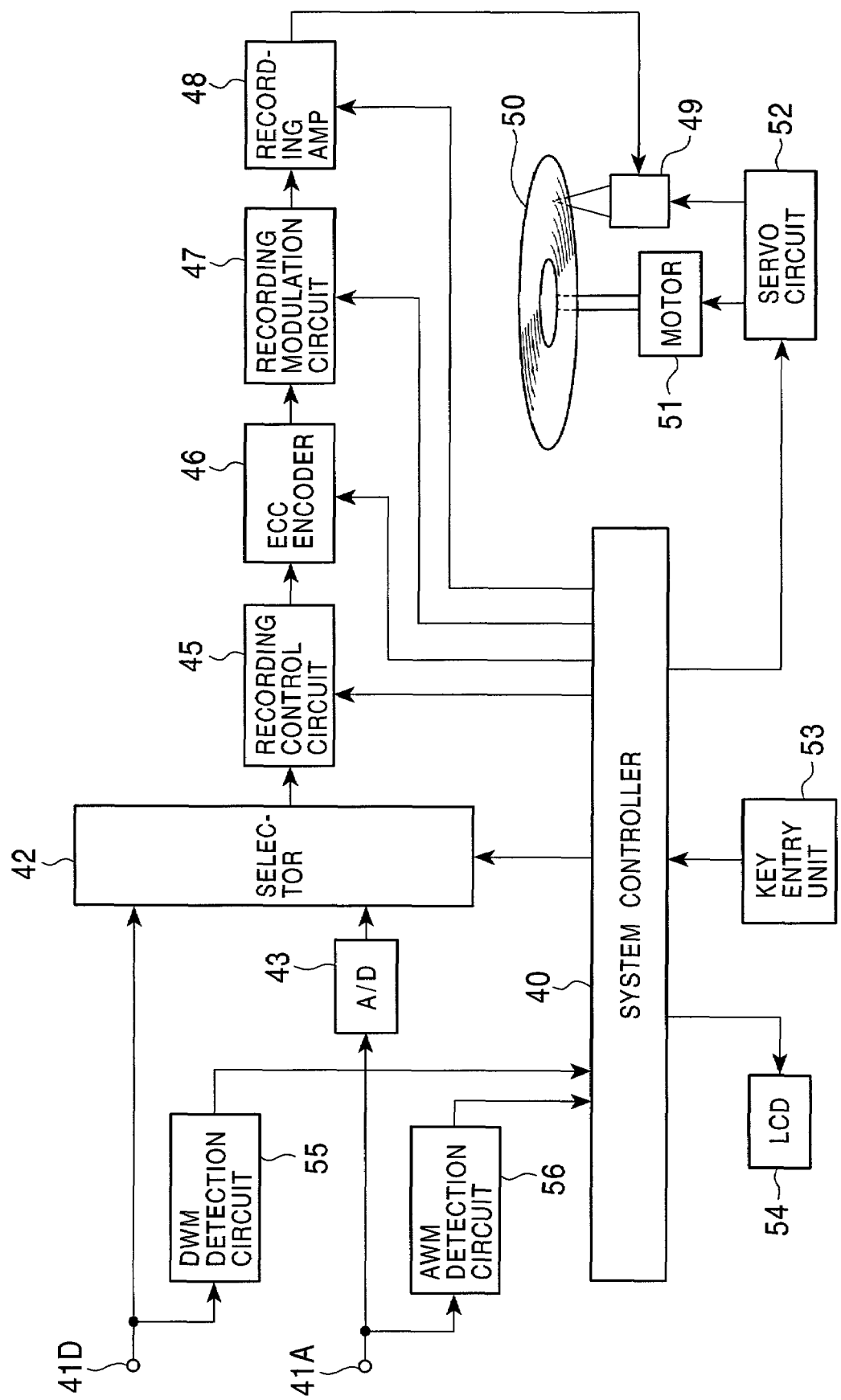
FIG. 10 is a block diagram of a data recording apparatus according to the second embodiment of the present invention.

Next, a data recording apparatus according to the second embodiment which records data in response to the data output through the above-described procedure is described. FIG. 10 is a block diagram of the data recording apparatus according to the second embodiment. The same reference numerals are assigned to the same components as those in the data recording apparatus according to the first embodiment shown in FIG. 5.

In FIG. 10, digital audio PCM data which is input through the digital input terminal 41D is supplied to the selector 42, as well as to a digital watermark detection circuit (hereinafter referred to as "DWM detection circuit") 55. An analog audio signal which is input through the analog input terminal 41A is supplied to the A/D converter 43, as well as to an analog watermark detection circuit (hereinafter referred to as "AWM detection circuit") 56.

According to the second embodiment, the DWM detection circuit 55 and the AWM detection circuit 56 each detect both electronic watermark information for the original data and the copied data.

An output of the detection of the DWM detection circuit 55 and an output of the detection of the AWM detection circuit 56 are supplied to the system controller 40. The system controller 40 controls the recording control circuit 45 according to these outputs of the detection to achieve a recording control. If the electronic watermark information for the original data and the electronic watermark information for the copied data were both detected by the DWM detection circuit 55 or the AWM detection circuit 56, the electronic watermark information for the copied data is decoded for a recording control. The structure of the other components after the recording control circuit 45 is the same as in the data recording apparatus shown in FIG. 5.

Figure 11:
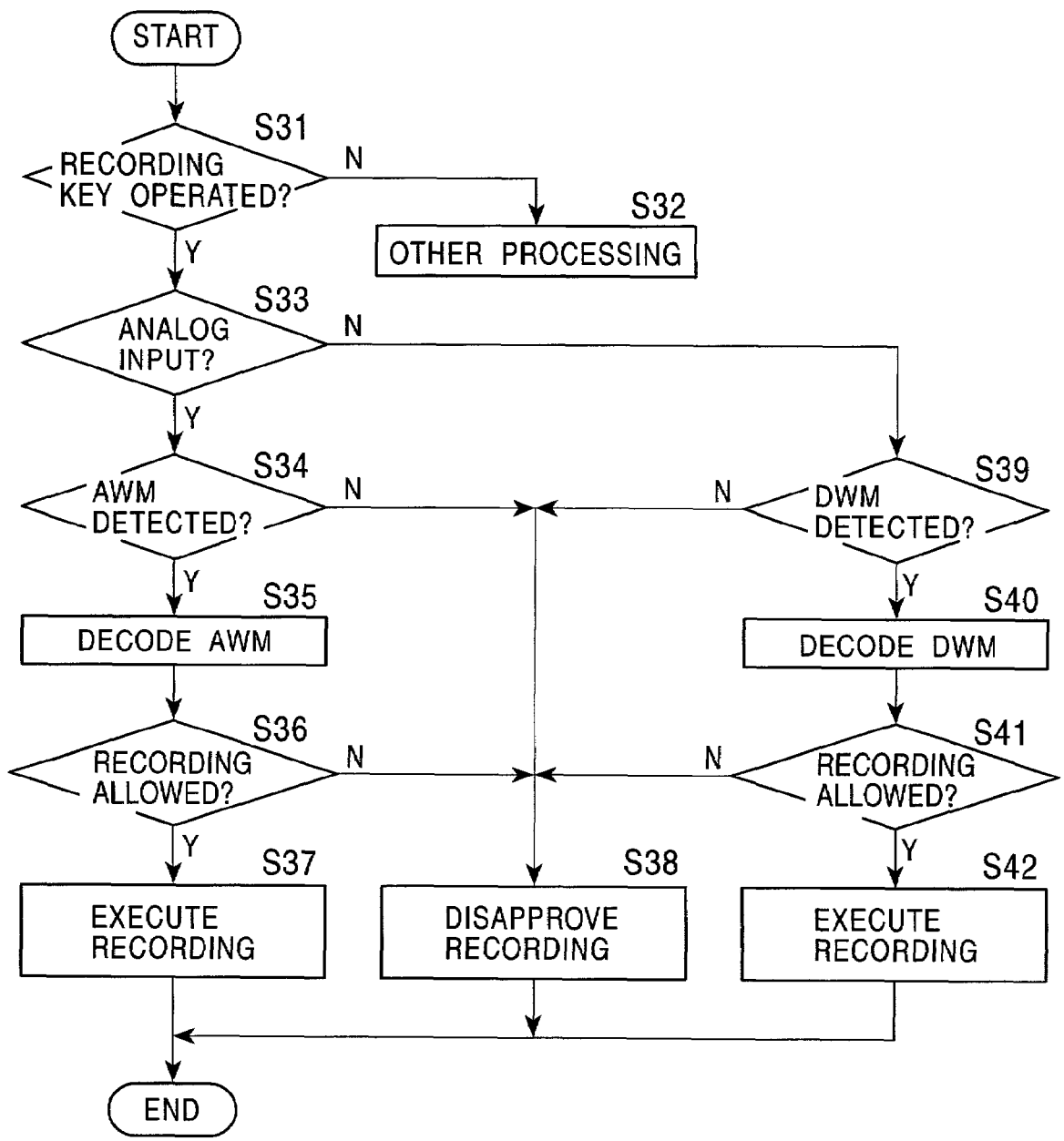
FIG. 11 is a flowchart for illustrating the operation of the data recording apparatus in accordance with the second embodiment shown in FIG. 10.

FIG. 11 is a flowchart for illustrating the data recording operation (a data recording method according to the second embodiment) of the data recording apparatus according to the second embodiment shown in FIG. 10.

First, it is determined whether or not the recording command key in the entry unit 53 has been operated to give a recording command (step S31). If it is determined that the recording command key has not been operated, a process according to some other key that has been operated is performed (step S32).

If the recording command key has been operated, it is determined that the recording command has been given, and it is determined whether or not the input data is in analog signal format (step S33). If it is determined as an input in analog signal format, a detection of the analog watermark information is performed such that it is determined whether or not the analog watermark information was detected (step S34).

As described above, according to the second embodiment, the analog watermark information must have been embedded in the audio data if analog data was played back for the recording. Therefore, if the analog watermark information was not detected, it can be seen that the playback data has been entered without permission.

Accordingly, if the analog watermark information was not detected at step S34, the system controller 40 controls the recording control circuit 45 so that the recording is disapproved (step S38). More specifically, supplying of the recording data to the ECC encoder 46 is stopped, so that the recording operation is cancelled.

If the analog watermark information was detected at step S34, the analog watermark information is decoded (step S35). It is determined whether or not the decoded analog watermark information indicates "first-generation-copy allowed" (step S36). If it indicates "first-generation-copying allowed," the recording control circuit 45 is controlled so as to execute the recording operation (step S37). Then, the data is supplied to the ECC encoder 46 and the subsequent components so that the data is duplicated and recorded on the disk 50.

If it is determined at step S36 that the analog watermark information indicates "recording prohibited," the process proceeds to step S38, in which the recording operation is terminated.

If it is determined at step S33 as an input in digital signal format rather than analog signal format, a detection of the digital watermark information is performed such that it is determined whether or not the digital watermark information was detected (step S39). If the digital watermark information was not detected at step S39, the system controller 40 controls the recording control circuit 45 so that the recording is disapproved (step S38). More specifically, supplying of the recording data to the ECC encoder 46 is stopped, so that the recording operation is cancelled.

If the digital watermark information was detected at step S39, the digital watermark information is decoded (step S40). It is determined whether or not the decoded digital watermark information indicates "first-generation-copying allowed" (step S41). If it indicates "first-generation-copying allowed," the recording control circuit 45 is controlled so as to execute the recording operation (step S42). Then, the data is supplied to the ECC encoder 46 and the subsequent components so that the data is duplicated and recorded on the disk 50.

If it is determined at step S41 that the digital watermark information indicates "recording prohibited," the process proceeds to step S38, in which the recording operation is cancelled. Then, the recording process terminates.

Accordingly, in the data playback apparatus of the second embodiment, electronic watermark information is embedded in audio data only when the recording command key has been operated, while the electronic watermark information is not being embedded in data for normal playback. This prevents a degradation in the quality of the resulting data due to the electronic watermark information being embedded therein.

In addition, methods of embedding the electronic watermark information may appropriately change depending upon an output in digital signal format or an output in analog signal format. The electronic watermark information may be embedded in a different manner depending upon original data or copied data to be played back and output. Therefore, optimal watermarking in consideration of maintenance of the quality of data and reliable performance of a copyright protection is achieved.

In the data playback apparatus according to the second embodiment, the switch circuits 24D and 24A are turned on or off to control the embedding of electronic watermark information, but the switch circuits 24D and 24A are not necessarily provided and the DWM generating circuit 23D and the AWM generating circuit 23A may be turned on or off, thereby providing the same advantages.

The above-noted analog and digital watermark processes are only illustrative, and the watermark process according to the present invention is not limited thereto.

As described above, data in which the electronic watermark information is not embedded cannot be duplicated and recorded, as in the first embodiment. In the data playback apparatus according to the second embodiment, therefore, the electronic watermark information is embedded when the optical disk 10 is of the ROM type, while the electronic watermark information is not being embedded when the optical disk 10 is of the RAM type, thereby providing the same advantages as described above.

In the data playback apparatus according to the second embodiment, it is not necessary that the electronic watermark information complying with the SCMS be embedded, and some data should only be embedded as electronic watermark information. In the data recording apparatus, it should only be determined whether or not the analog or digital watermark information was detected, and the electronic watermark information decoding steps S35 and S40 of FIG. 11 are not necessary, making the process more simple.

It is noted that the data playback apparatus according to the first embodiment may also use different methods of embedding the electronic watermark information depending upon original data or copied data to be played back and output, as is similar to the second embodiment.

Third Embodiment

In the first and second embodiments, the content of the electronic watermark information to be embedded is determined according to the disk type. In a third embodiment of the present invention, however, the electronic watermark information to be embedded is determined according to copy management information which is added to content data in advance. Other configurations are the same as in the first and second embodiments.

Figure 12:
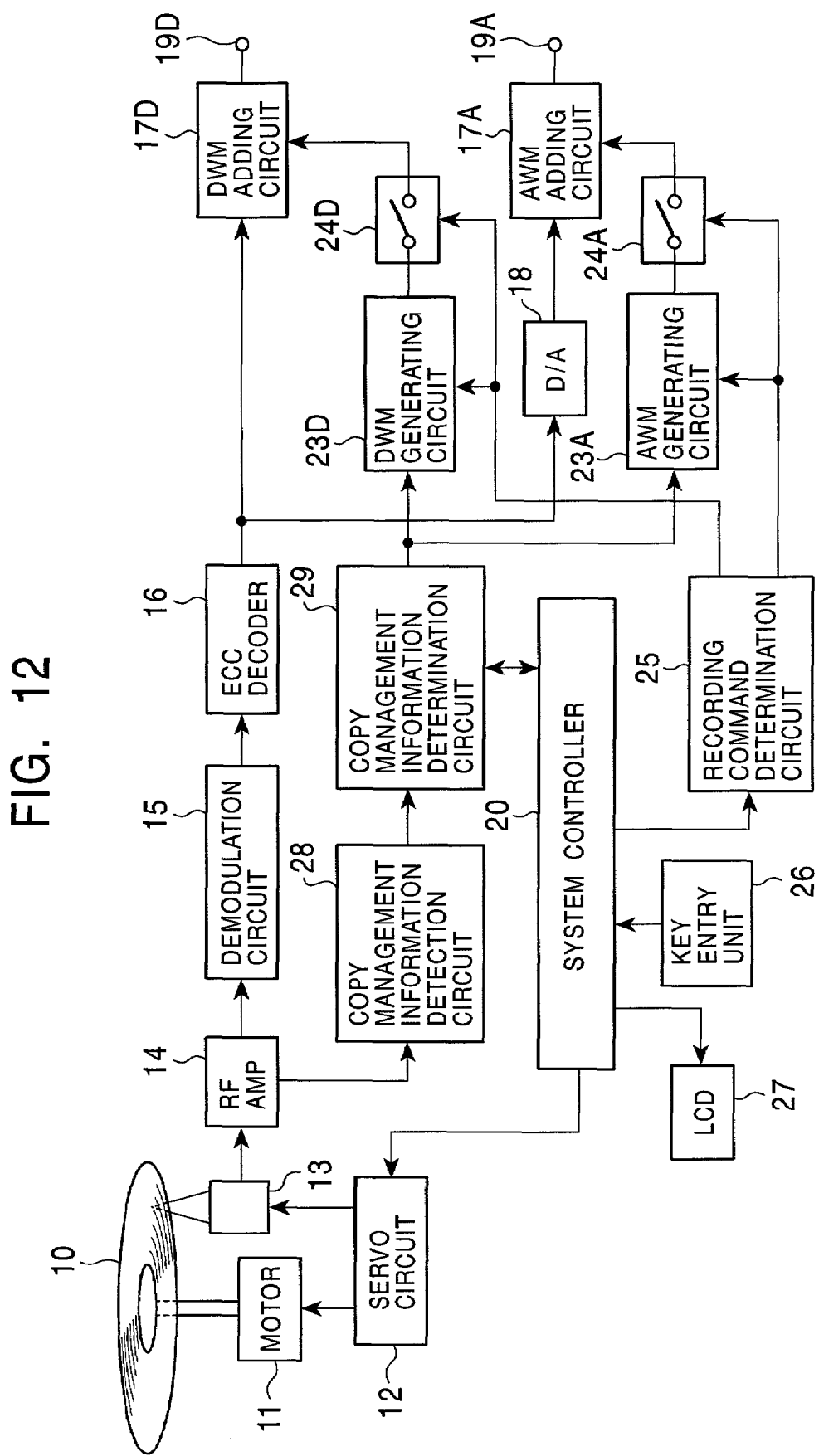
FIG. 12 is a block diagram of a data output apparatus according to a third embodiment of the present invention.

FIG. 12 is a block diagram of a data playback apparatus according to the third embodiment. According to the third embodiment shown in FIG. 12, a copy management information detection circuit 28 and a copy management information determining circuit 29 are provided in place of the wobble detection circuit 21 and the disk type determining circuit 22 shown in FIG. 7. An output of the determination of the copy management information determining circuit 29 is supplied to the DWM generating circuit 23D and the AWM generating circuit 23A, as well as to the system controller 20. The structure of the other components is the same as that shown in FIG. 7.

The copy management information according to the third embodiment may be SCMS information recorded together with audio data on the optical disk 10. It may also be electronic watermark information which is embedded in the audio data on the optical disk 10 in advance. In the latter case the copy management information detection circuit 28 and the copy management information determining circuit 29 may be replaced for an electronic watermark information detection circuit. The electronic watermark information is SCMS information.

According to the third embodiment, if the copy management information determined by the copy management information determining circuit 29 indicates "first-generation-copying allowed," it can be seen that the data from the optical disk 10 is original data. If the copy management information determined by the copy management information determining circuit 29 indicates "copy prohibited," it can be seen that the data from the optical disk 10 is once-copied data.

In the third embodiment, therefore, if the recording command has been given in the key entry unit 26, the analog watermark information and the digital watermark information are generated in the same manner as described above based on an output of the determination of the copy management information determining circuit 29.

Figure 13:
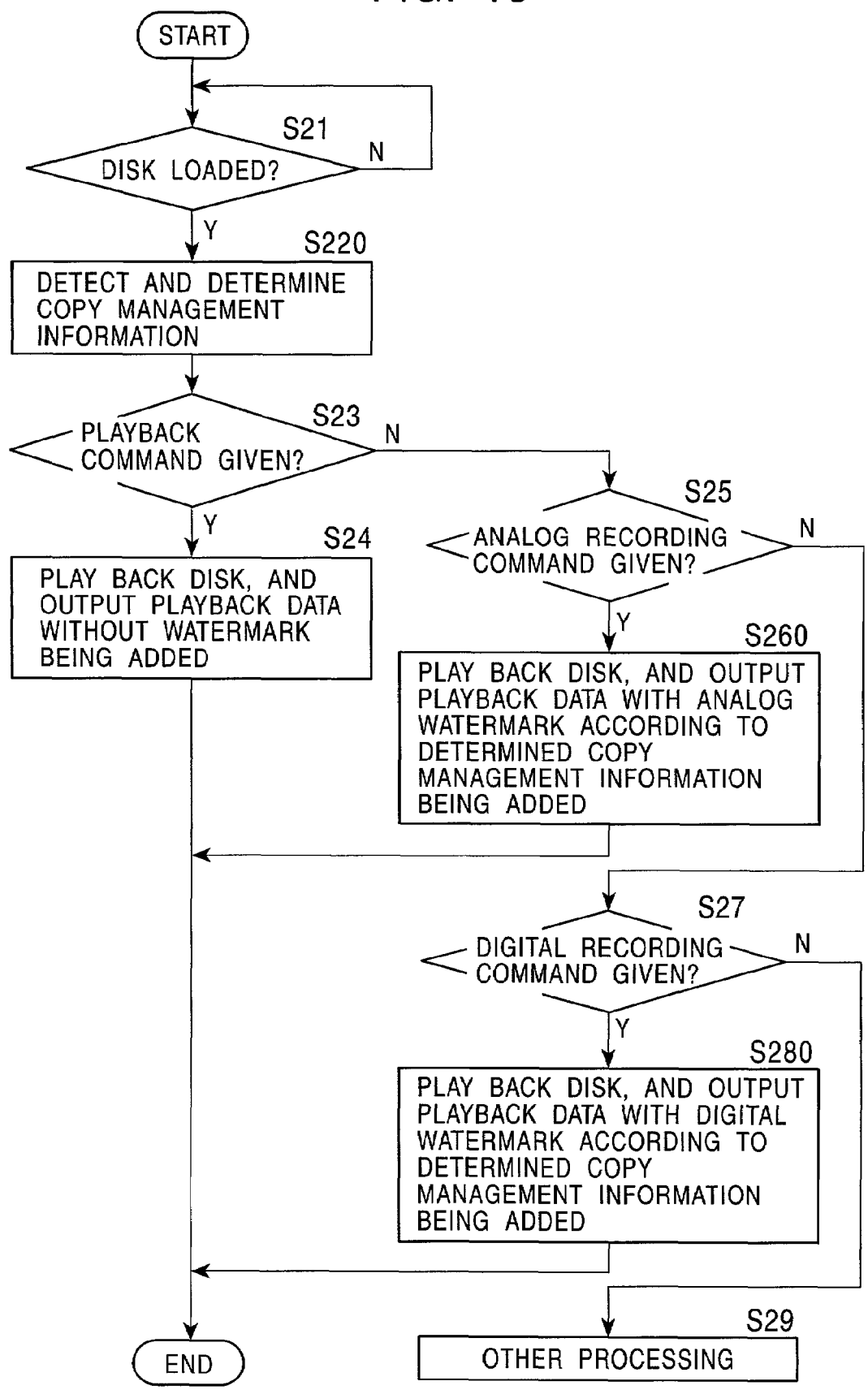
FIG. 13 is a flowchart for illustrating the operation in accordance with the third embodiment.

FIG. 13 is a flowchart of the operation of the data playback apparatus according to the third embodiment. In FIG. 13, steps S220, S260, and S280 are provided in place of steps S22, S26, and S28 of the flowchart in FIG. 9 which illustrates the operation of the data playback apparatus according to the second embodiment. Other steps are the same.

Figure 9:
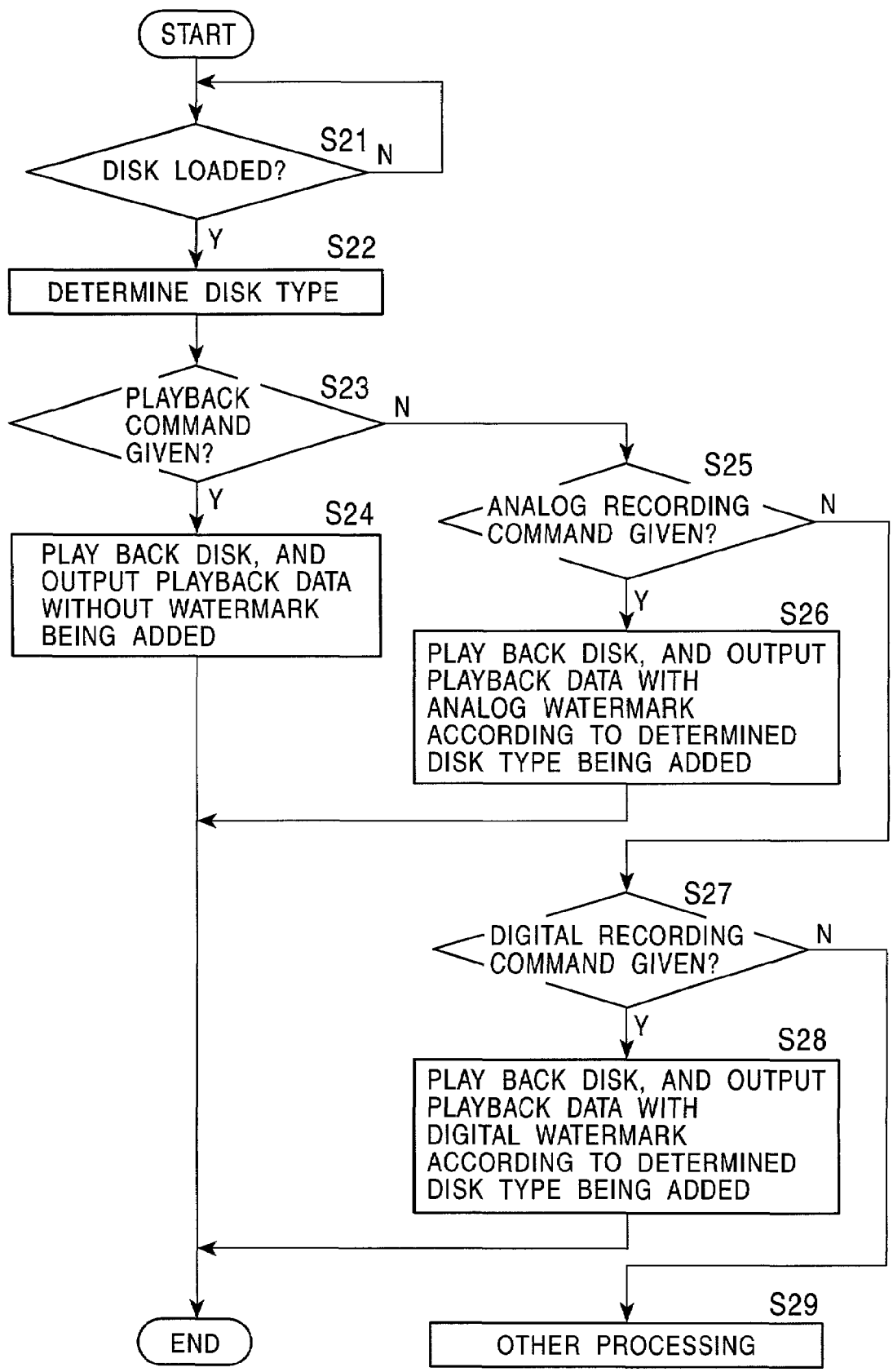
FIG. 9 is a flowchart for illustrating the operation in accordance with the second embodiment.

Specifically, while the disk type is determined at step S22 of FIG. 9 according to the second embodiment, the copy management information is detected and identified at step S220 of FIG. 13. While the analog watermark information and the digital watermark information are each generated according to the disk type at steps S26 and S28 of FIG. 9 in the second embodiment, the analog watermark information and the digital watermark information are generated according to an output of the determination of the copy management information at steps S260 and S280 of FIG. 13. More specifically, if the copy management information identified at step S220 indicates "first-generation-copying allowed," the electronic watermark information indicating "recording prohibited" is generated at steps S260 and S280. If the copy management information identified at step S220 indicates "recording prohibited," the data in analog format or in digital format is not output even if the recording command has been given. If the copy management information indicates "copying free," the electronic watermark information indicating "copying free" is generated at step S260 and S280.

The same advantages as in the second embodiment are provided in the third embodiment. The same modifications and changes as in the second embodiment may be also made.

Fourth Embodiment

Figure 14:
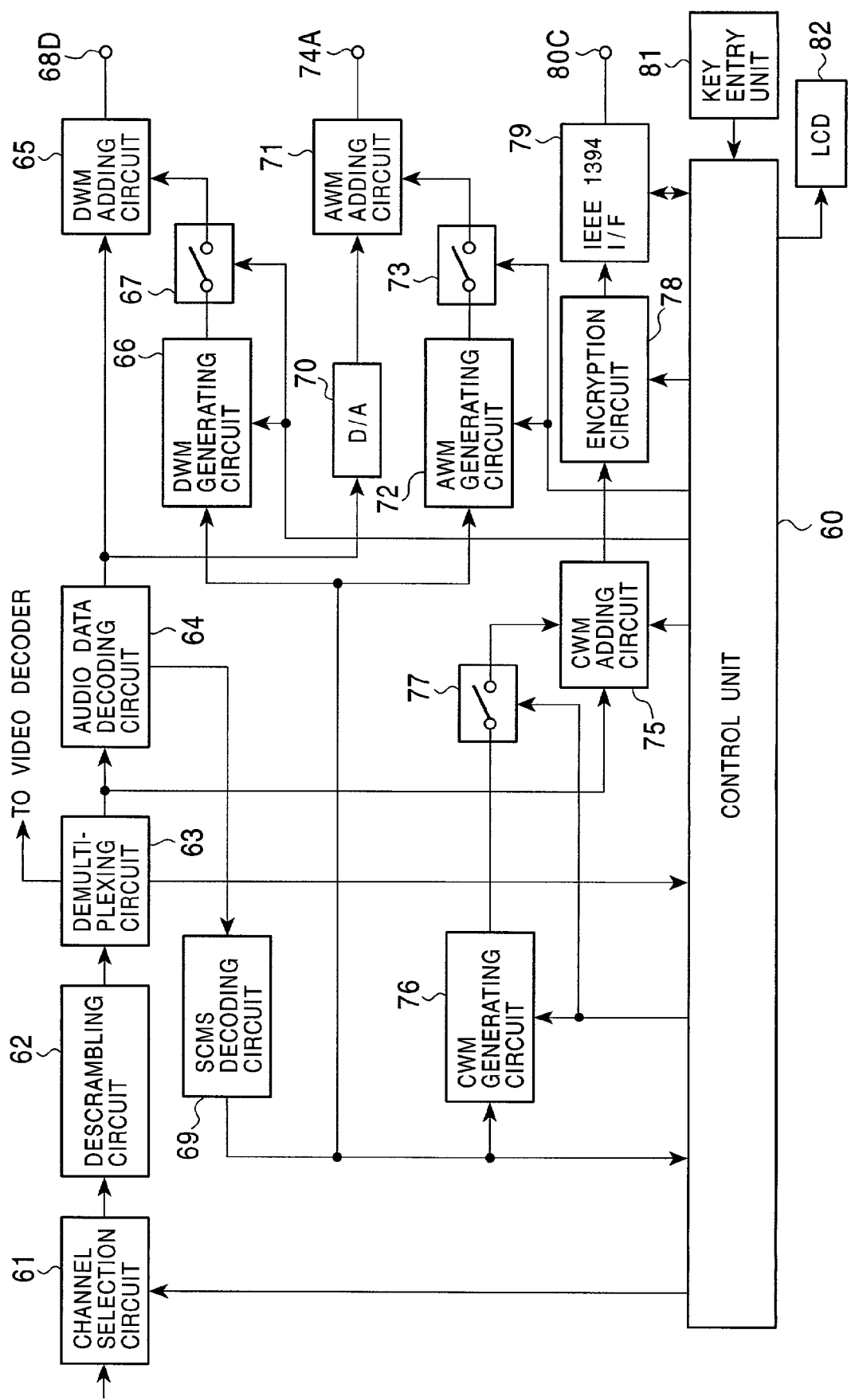
FIG. 14 is a block diagram of a data output apparatus according to a fourth embodiment of the present invention.

FIG. 14 is a data output apparatus according to a fourth embodiment of the present invention. The data output apparatus according to the fourth embodiment may be implemented as a set-top box used to receive the digital television satellite broadcasting.

As shown in FIG. 14, as a channel selection control signal according to a channel selection operated by a user is supplied from a control unit 60 to a channel selection circuit 61, the channel selection circuit 61 supplies a signal of the selected channel to a descrambling circuit 62 to descramble the broadcast signal. The descrambled channel signal is supplied to a demultiplexing circuit 63. Since the output signal from the channel selection circuit 61 contains a plurality of broadcast program data, the demultiplexing circuit 63 extracts the broadcast program data according to a broadcast program selected by the user from the control unit 60.

The broadcast program audio data from the demultiplexing circuit 63 has been compressed using MPEG. Thus, the audio data from the demultiplexing circuit 63 is supplied to an audio data decoding circuit 64, and is decoded using MPEG so as to be extended.

The data that has been decoded using MPEG is supplied to a digital output terminal 68D through a DWM adding circuit 65. The data that has been decoded using MPEG is converted into an analog signal by a D/A converter 70, and is also supplied to an analog output terminal 74A through an AWM adding circuit 71. The compressed audio data from the demultiplexing circuit 63 is also supplied to an encryption circuit 78 through an electronic watermark information adding circuit for compressed data (hereinafter referred to as "CWM adding circuit") 75, and then to a compressed-signal output terminal 80C via an IEEE 1394 interface 79.

According to the fourth embodiment, the signal from the audio data decoding circuit 64 is supplied to an SCMS decoding circuit 69, and the SCMS information attached to the audio data is decoded. The SCMS information from the SCMS decoding circuit 69, which corresponds to the copy management information according to the third embodiment, is supplied to the DWM generating circuit 66, the AWM generating circuit 72, and the CWM generating circuit 76, as well as to the control unit 60.

In response to the recording command which has been given from a key entry unit 81, operation control signals are supplied from the control unit 60 to the DWM generating circuit 66, the AWM generating circuit 72, and the CWM generating circuit 76, and switch control signals are supplied to the switch circuits 67, 73, and 77. The control unit 60 includes a recording command determination unit.

In the same way as in the third embodiment, in response to the recording command which has been given, the playback data are output with the electronic watermark information embedded therein in output format of an analog signal and in output format of a digital signal.

In the fourth embodiment, however, if a command to output playback data in compressed-data format is given through the key entry unit 81 even though the recording command has not been given, the electronic watermark information is automatically embedded in the playback data output forwarded to a data recording apparatus.

In the fourth embodiment, as in the second embodiment, different methods of embedding the electronic watermark information are used depending upon original data or copied data. The electronic watermark information handled depending upon output format of an analog signal or output format of a digital signal is the same as in the second embodiment.

As used in the fourth embodiment, a method of embedding the electronic watermark information in compressed-data output format is to embed the electronic watermark information in DCT (discrete cosine transform) coefficients, such that the electronic watermark information is embedded only in the highest-order coefficient for original data, while the electronic watermark information is embedded in (the highest-order minus 2) coefficients for copied data.

In the fourth embodiment, the same operation is performed as in the above-described embodiments if the recording command was given in analog output format or in digital output format, and a description thereof is omitted. The operation in compressed data format is now described.

FIG. 15 is a flowchart for illustrating an IEEE 1394 interface output control of the data playback apparatus according to the fourth embodiment.

First, at step S51, communication is made to/from an output destination via an IEEE 1394 bus, and it is determined whether or not the output destination is a device capable of transmitting/receiving data in a secure state, such as a device compatible with the IEEE 1394 interface (hereinafter referred to as "compliant device"). If it is determined that it is not a compliant device, the control proceeds to step S56, in which the digital information (data that has been compressed using MPEG) is encrypted and is then output, but an encryption key for use in decryption is not sent to the output destination. Thus, it is impossible for incompliant devices to decrypt the data.

If it is determined at step S51 that the output destination is a compliant device, the control proceeds to step S52 to determine whether or not the output destination compliant device is a recording device. If it is determined at step S52 that the output destination is not a recording device, the control skips to step S55, in which the digital information (data that has been compressed using MPEG) is encrypted and is then output, and an encryption key for use in decryption is also sent to the output destination.

If it is determined at step S52 that the output destination is a compliant recording device, the control proceeds to step S53, in which the SCMS information is decoded to determine whether or not it indicates "first-generation-recording allowed." If it is determined at step S53 that the information indicates "recording prohibited" instead of "first-generation-recording allowed," the control proceeds to step S56, in which the digital information (data that has been compressed using MPEG) is encrypted and is then output, but an encryption key for use in decryption is not sent to the output destination.

If it is determined at step S53 that the information indicates "recording allowed," the compressed-data watermark information passed from the CWM generating circuit 76 is supplied to the CWM adding circuit 75 through the switch circuit 77 according to the SCMS information. That is, if the compressed-data output command has been given, the control unit 60 makes the CWM generating circuit 76 operable, and turns on the switch circuit 77 when the output destination is a recording device.

Then, the control proceeds to step S55, in which the digital information (data that has been compressed using MPEG) is encrypted and is then output, and an encryption key for use in decryption is also sent to the output destination. That is, the compressed-data watermark information is embedded in the compressed data by the CWM adding circuit 75. The resulting data is encrypted by the encryption circuit 78, and is transferred to the recording apparatus via the IEEE 1394 interface 79.

The data recording apparatus at the transfer destination decrypts the transferred data, and then a detection of the compressed-data watermark information is performed such that if the compressed-data watermark information was not detected, the data recording apparatus determines that the watermark information indicates recording disapproved. If the watermark information was detected, the data recording apparatus identifies the content thereof to control the recording.

As described above, according to the fourth embodiment, since the data playback apparatus knows whether or not the output destination is a recording apparatus, a user only gives an output command in compressed data format in order to provide a suitable copyright protection.

According to the fourth embodiment, the switch circuits 67, 73, and 77 are not necessarily provided and the DWM generating circuit 66, the AWM generating circuit 72, and the CWM generating circuit 76 may be turned on or off, thereby providing the same advantages.

The copy management information attached to the received data is not limited to SCMS information, but may be electronic watermark information or any other information.

Other Embodiments

Although the playback data is audio data in all of the first to fourth embodiments, it is to be understood that the data according to the present invention is not limited to audio data, but may be video data or game program data to be copyright protected.

Although the recording medium to be played back is a disk in the illustrated embodiments, it is not limited to disks, but may be a card-type memory. The data output apparatus is not limited to a playback apparatus, but may be implemented as a receiving apparatus such as a set-top box in the fourth embodiment, or any other data output apparatus. The present invention may be further embodied by a data output unit for outputting data downloaded over the Internet.

In the illustrated embodiments, if electronic watermark information is not embedded in data, recording of the data is disapproved. However, as long as recording of the data is substantially disapproved, recording of the data may be controlled such that the data may be recorded but cannot be recorded precisely.

Furthermore, the present invention is also applicable when strong electronic watermark information is embedded in data such that the electronic watermark information always prohibits copying of the data. That is, in this case, for example, if copying is to be allowed, one conceivable approach in which electronic watermark information indicating "copying allowed" is embedded in addition to the strong electronic watermark information is achieved by the present invention.

What is claimed is:

1. A method for outputting data read from a recording medium, comprising the steps of:
    determining a type of the recording medium as being a read-only recording medium or a random access recording medium;
    reading the data from the recording medium in response to a playback command or a recording command, wherein the data does not contain electronic watermark information;
    decoding the data read from the recording medium;
    generating and embedding electronic watermark information in the decoded data if the data was read in response to the recording command;
    wherein said electronic watermark information is based on the type of the recording medium; and
    outputting the decoded data with the embedded electronic watermark information if the data was read in response to the recording command; and
    outputting the decoded data without electronic watermark information if the data was read in response to the playback command.

2. The method according to claim 1, wherein the electronic watermark information indicates at least a first generation recording is allowed when the recording medium is the read-only type of recording medium.

3. The method according to claim 1, wherein the electronic watermark information indicates recording is prohibited when the recording medium is the random access type of recording medium.

4. The method according to claim 1, wherein the type of the recording medium is determined by determining whether a pit wobbling portion is present on the recording medium.

5. The method according to claim 1, wherein the decoded data is converted into an analog signal, and the electronic watermark information is embedded in the analog signal.

6. An apparatus for outputting data read from a recording medium, comprising:
    a determination circuit for determining a type of the recording medium as being a read-only recording medium or a random access recording medium;
    a head for reading the data from the recording medium in response to a playback command or a recording command, wherein the data does not contain electronic watermark information;
    a decoder for decoding from the data read by said head; and
    a watermarking unit for generating and embedding electronic watermark information in the decoded data if the data was read in response to the recording command; wherein said electronic watermark information is based on the type of the recording medium; and
    an output unit for outputting the decoded data with the embedded electronic watermark information if the data was read in response to the recording command and outputting the decoded data without electronic watermark information if the data was read in response to the playback command.

7. The apparatus according to claim 6, wherein the electronic watermark information indicates at least one recording is allowed when said determination circuit determines that the recording medium is the read-only type of recording medium.

8. The apparatus according to claim 6, wherein the electronic watermark information indicates recording is prohibited when said determination circuit determines that the recording medium is the random access type of recording medium.

* * * * *